United States Patent
Roberts

(10) Patent No.: US 8,289,570 B2
(45) Date of Patent: Oct. 16, 2012

(54) METHOD AND APPARATUS FOR ASCERTAINING AND ADJUSTING FRICTION BETWEEN MEDIA PAGES IN A DOCUMENT FEEDER

(75) Inventor: Troy Roberts, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1038 days.

(21) Appl. No.: 12/250,067

(22) Filed: Oct. 13, 2008

(65) Prior Publication Data

US 2009/0257100 A1 Oct. 15, 2009

(51) Int. Cl.
*G06K 15/10* (2006.01)
*G06K 15/00* (2006.01)
*B41J 25/308* (2006.01)
*B41J 2/085* (2006.01)
*B41J 2/09* (2006.01)
*B41J 2/12* (2006.01)
*B41J 2/125* (2006.01)
*B41J 2/105* (2006.01)
*B41J 2/175* (2006.01)
*B41J 2/27* (2006.01)
*B41J 32/00* (2006.01)

(52) U.S. Cl. ........... 358/1.8; 358/1.12; 347/75; 347/76; 347/77; 347/78; 347/79; 347/80; 347/81; 347/93; 347/8; 400/124.16; 400/193; 400/194; 400/195; 400/196

(58) Field of Classification Search .......... None
See application file for complete search history.

(56) References Cited

U.S. PATENT DOCUMENTS

| 4,927,277 | A | * | 5/1990 | Niikawa | 400/56 |
| 5,005,746 | A | | 4/1991 | Murakami et al. | |
| 5,067,835 | A | * | 11/1991 | Yamamoto et al. | 400/582 |
| 5,087,141 | A | * | 2/1992 | Kelly | 400/352 |
| 5,610,636 | A | * | 3/1997 | Hanabusa et al. | 347/8 |
| 5,806,992 | A | * | 9/1998 | Ju | 400/56 |
| 5,888,000 | A | | 3/1999 | Yasuoka | |
| 5,956,161 | A | | 9/1999 | Takashimizu et al. | |
| 6,097,415 | A | * | 8/2000 | Kita et al. | 347/213 |
| 6,450,494 | B1 | | 9/2002 | Adema | |
| 6,918,643 | B2 | * | 7/2005 | Kwag et al. | 347/8 |
| 6,953,244 | B2 | * | 10/2005 | Chen et al. | 347/95 |
| 6,991,328 | B2 | | 1/2006 | Ishii | |
| 7,005,293 | B2 | * | 2/2006 | DaQuino et al. | 435/287.2 |
| 7,648,215 | B2 | * | 1/2010 | Song et al. | 347/8 |
| 7,811,014 | B2 | * | 10/2010 | Tamaki et al. | 400/56 |
| 2003/0071882 | A1 | * | 4/2003 | Mott | 347/94 |
| 2006/0225585 | A1 | * | 10/2006 | Shyu | 101/3.1 |
| 2006/0262168 | A1 | * | 11/2006 | Hawkins et al. | 347/74 |
| 2007/0048057 | A1 | * | 3/2007 | Youn et al. | 400/58 |

FOREIGN PATENT DOCUMENTS

| JP | 57112250 A2 | 7/1982 |
| JP | 6312844 A2 | 11/1994 |
| JP | 11029231 A2 | 2/1999 |

* cited by examiner

*Primary Examiner* — Halina S Kassa

(57) ABSTRACT

A method relating to ascertaining and adjusting friction between media pages in a document feeder. The method includes: detecting slipping of a media page when traversing from a stack of media pages to passing through a path defined by the document feeder; and sending a signal to a fluid-containing cartridge to spray small drops of fluid onto the slipping media page soon after the slipping is detected while the media page passes through the document feeder. A system and apparatus are also associated with the above method.

18 Claims, 3 Drawing Sheets

METHOD AND APPARATUS FOR ASCERTAINING AND ADJUSTING FRICTION BETWEEN MEDIA PAGES IN A DOCUMENT FEEDER

BACKGROUND

The present disclosure relates generally to a method for ascertaining and adjusting friction between media pages inside a document feeder.

Generally, automatic document feeder (ADF) designs involve rollers and mechanical components which work well with some kinds of media but not with others. In order to change the friction properties of the rollers to precisely adjust for a particular media, it has, for example, been necessary to replace the rollers or the mechanical components for different kinds of media.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
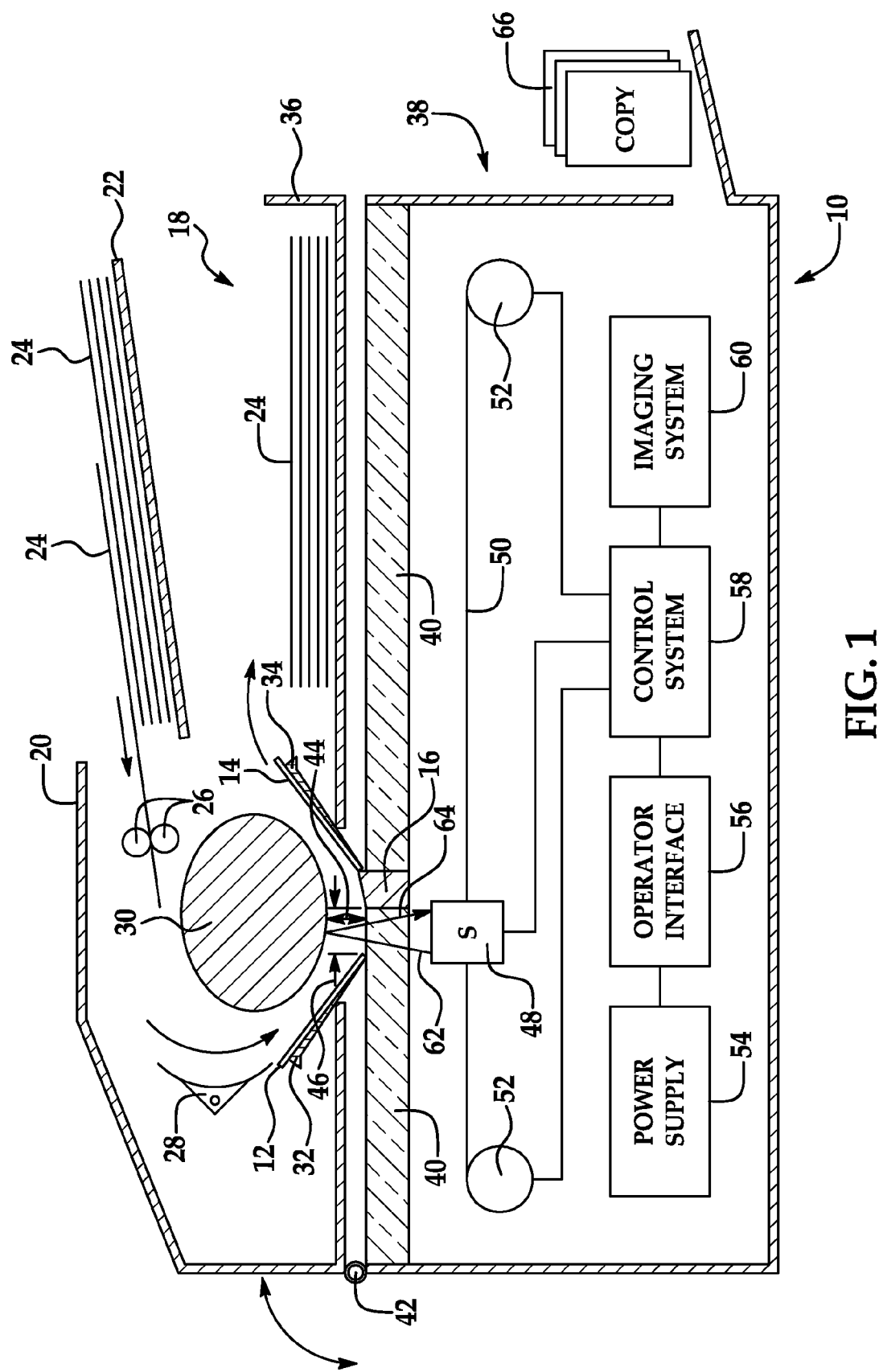
FIG. 1 is a schematic side elevation, cross-sectional view depicting an imaging device and associated automatic document feeder, in accordance with an embodiment of the disclosure.

Embodiments of the method, system and apparatus disclosed herein advantageously incorporate an inkjet-like cartridge inside the automatic document feeder (ADF) paper path in the general area of the pick roller. In general, the cartridge contains water or another appropriate aqueous liquid which increases the friction of the paper as it passes through the ADF. When the ADF detects a page slipping, the ADF can substantially immediately change the friction coefficient of the paper (for example, glossy magazine pages or ultra-thin carbon copies) to be fed more reliably. For example, when the ADF detects a page slipping, the ADF sends an electrical signal to the inkjet-like cartridge, causing small drops of liquid, e.g., water to spray onto the paper. The liquid droplets increase the coefficient of friction between the page and the pick rollers, allowing the page to be fed more reliably. The water or other aqueous liquid does not damage the paper or the printed text on the paper.

The effect of having the cartridge spray the liquid on the paper when slipping occurs is to substantially instantaneously change the friction coefficient of the paper. This aids in eliminating paper jams and misfeeds. It also advantageously increases the potential types of paper that can be fed through an ADF.

More specifically, the present disclosure relates to a method of ascertaining and adjusting friction between media pages in a document feeder. An embodiment of the method includes detecting slipping of a media page when traversing from a stack of media pages to passing through a path defined by the document feeder; and sending a signal to a fluid-containing cartridge to spray small drops of fluid onto the slipping media page soon after the slipping is detected while the media page passes through the document feeder.

It is to be understood that, as used herein, the terms "soon" or "substantially instantaneously" are defined to mean from about 50 ms to about 300 ms after the page slip is detected. In another embodiment, "soon" or "substantially instantaneously" are defined to mean from about 50 ms to about 100 ms. It is to be further understood that this time after detection generally depends upon the fluid that is being used inside the cartridge, and may be outside of the example ranges stated above in some instances.

Yet further, it is to be understood that "small" drops of fluid as used herein is meant to encompass drops ranging in size from about 4 picoliters to about 8 picoliters. In another embodiment, "small" drops of fluid is meant to encompass drops ranging in size from about 5 picoliters to about 5.5 picoliters. It is to be further understood that the drop size generally depends upon the size of the feed rollers inside the document feeder, and may be outside of the example ranges stated above in some instances.

Detection of paper slippage can be accomplished in many ways. In an embodiment, two or more optical sensors are placed in the paper path as the page moves from the stack of media pages through the document feeder. A first optical sensor 85 detects if the paper is initially loaded from the stack to the feeder (see FIG. 3). This signals to the scanner that something needs to be scanned. A second optical sensor 87 detects the leading edge of the paper further down the line in the document feeder. If the first optical sensor 85 detects the paper loading into the document feeder, the feed roller 26 (discussed further below) rotates until the edge of the page is detected by the second sensor 87. A feed roller rotation tracker 89 of the scanner keeps track of how many rotations the feed roller makes between when the paper is sensed by the first optical sensor 85 up to the point at which the paper is sensed by the second optical sensor 87. Thus the scanner keeps track of how far the paper should be moving as opposed to how far the paper is actually moving. If the second optical sensor 87 does not detect the edge of the paper at a predicted time, the paper can be assumed to be slipping. In many scanner designs, if the page slips, the user can lift up the feed roller off the page for a few seconds, then move the feed roller back onto the page and let the machine try again. Sometimes the impact of the feed roller against the page causes the page to start moving again.

The present application also discloses a system for ascertaining and adjusting friction between media pages in a document feeder. The system includes a printer having a document feeder; a stack of at least two media pages for printing to be taken one-by-one from the stack of media pages and passed through the path defined by the document feeder; means for detecting slipping of at least one of the media pages in the document feeder when the media page is being taken from the stack of media pages and passed through the path defined by the document feeder; means for generating a signal to send to a fluid-containing cartridge; and means, upon receipt of the signal, for causing the fluid-containing cartridge to spray small drops of fluid onto the slipping media page soon after slipping is detected.

The present application also discloses an apparatus for ascertaining and adjusting friction between media pages in a document feeder including: means for detecting slipping of at least one media page taken from a stack of media pages and passed through the path defined by the document feeder; means, operatively connected to the detecting means, for generating a signal indicating slipping of the at least one media page; and a fluid-containing cartridge operatively connected to the signal generating means, the fluid-containing cartridge configured to spray small drops of fluid onto the at least one media page passing through the path defined by the document feeder upon receipt of the signal, and configured to stop spraying the fluid upon non-receipt of the signal or upon receipt of a signal from the signal generating means indicating that no slipping is occurring.

In an embodiment of the method, system and apparatus disclosed by the present application, the at least one media page is selected from the group consisting of plain paper, glossy photo paper, porous paper and non-porous paper.

Furthermore, in another embodiment of the present application, the document feeder is operatively connected to a device selected from the group consisting of printers, scanners, photocopiers, digital senders, and fax machines.

In yet another embodiment disclosed by the present application, the fluid-containing cartridge is an inkjet-like cartridge. As defined herein, "inkjet-like" cartridge and "inkjet" cartridge are meant to encompass cartridges that are fabricated and function as conventional thermal or piezoelectric inkjet cartridges, but are configured to contain and dispense an anti-slip/friction-adjusting fluid instead of ink.

In still another embodiment disclosed by the present application, the fluid in the fluid-containing cartridge is a clear/translucent fluid selected from the group consisting of water, friction-adjusting fluids, and combinations thereof.

In another embodiment disclosed by the present application, the fluid-containing cartridge is positioned in the document feeder between the stack of media pages and an end of the path defined by the document feeder.

Referring now to the figures, FIG. 1 depicts an imaging device 10 having an automatic document feeder (ADF) 18 in accordance with one embodiment of the present disclosure but not picturing the inkjet-like cartridge having the friction-adjusting fluid. The ADF 18 includes a housing 20 ("ADF housing"), an input tray 22, pinch rollers (pickup and feed) 26, a curved guide element 28, a feed guide 30, and an output tray 36; each of which is formed to operatively function with the ADF 18. The input tray 22, pickup and feed rollers 26, curved guide element 28, feed guide 30, and output tray 36 may all be connected to the housing 20, either directly or indirectly.

The ADF 18 may further include a first document guide 12, being connected to a support element 32. The ADF 18 may also include a second document guide 14, which is connected to a support element 34. Document guide support elements 32 and 34 can be operatively connected to the ADF housing 20, either directly or indirectly. The first and second document guides 12 and 14 are supported in spaced-apart relationship such that a substantially fixed void is defined therebetween. The first and second document guides 12 and 14 contact sheet media 24 as it passes through the ADF 18.

The imaging device 10 further includes an imaging apparatus 38. The imaging apparatus 38 includes a flatbed 40, a scanning device 48, support means 50, positioner(s) 52, and subsystem elements 54 (power supply), 56 (operator interface), 58 (control system), and 60 (imaging system), each of which is formed to operatively function within the imaging apparatus 38.

When the ADF 18 and the imaging apparatus 38 of the imaging device 10 are positioned as depicted in FIG. 1, the area of the flatbed 40 that is generally underlying the feed guide 30 is defined as a scan window 46. Additionally, the spacing between the lower side of the feed guide 30 and the upper surface of the scan window 46 is defined as a sheet passage gap 44. It will be noted that the gap 44 is continuous, not having an element disposed between the scan window 46 and the feed guide 30 (except during the scanning process, when sheet media 24 can be disposed in the gap 44). That is, the gap 44 is generally defined by the scan window 46 and the feed guide 30, and not by an intermediate element.

The imaging apparatus 38 may further include a diverter 16 that may have a generally wedge-shaped cross-section and is located laterally of the scan window 46, and is operatively received within the plane of the flatbed 40. The diverter 16 serves to direct the sheet media 24 from the scan window 46 onto the second document guide 14, and toward the output tray 36. Alternate and/or additional embodiments (not shown) can also be provided to guide sheet media 24 from the scan window area 46 onto the second document guide 14.

Operation of embodiment(s) of the imaging device 10 is generally as follows: sheet media 24 is drawn from the input tray 22 by the pinch rollers 26, and transported toward the scan window 46. The first document guide 12 cooperates with the feed guide 30 such that the transported media sheet 24 is passed through the gap 44 and over the scan window 46. The scanning device 48 optically reads the image content of the media sheet 24 during its passage through the gap 44, via projected and reflected light beams 62 and 64, respectively.

The scanning device 48 produces a scan signal (not shown) corresponding to the image content of the passing sheet media 24 to the subsystem components 58 and 60 for processing. The diverter 16, the second document guide 14, and the feed guide 30 cooperate to guide the passing sheet media 24 out of the gap 44 and onto the output tray 36. In this context, the second document guide 14 is in close proximity to, or (in some embodiments) in contact with, the diverter 16 during normal use. This operation is generally repeated, until all of the sheet media 24 present in the input tray 22 has been passed through the gap 44 and scanned by the scanning device 48. As depicted, the imaging apparatus 38 can render copies 66 corresponding to the image content of the sheet media 24. It is to be understood that the imaging apparatus 38 can produce an electronic file of the scanned document, or an electrical signal representative of images on the document, for immediate or later use, or processing.

Further, it is to be understood that the dimension of the passage gap 44 may be sufficient to permit the sheet media 24 to pass freely through the gap 44, but may also be minimized (within dimensions of anticipated sheet media to be received with the gap 44) so as to substantially attenuate any undesired flutter or motion of the sheet media 24 during passage.

The sheet media 24 that pass through the gap 44 can do so while contacting the scan window 46, which can in turn require periodic cleaning. This cleaning is readily facilitated by pivoting the ADF 18 about the hinge 42 and away from the flatbed 40. It is noted that no elements of either the ADF 18 or the imaging apparatus 38 need to be removed, reinstalled, or replaced during such a cleaning operation.

Figure 2:
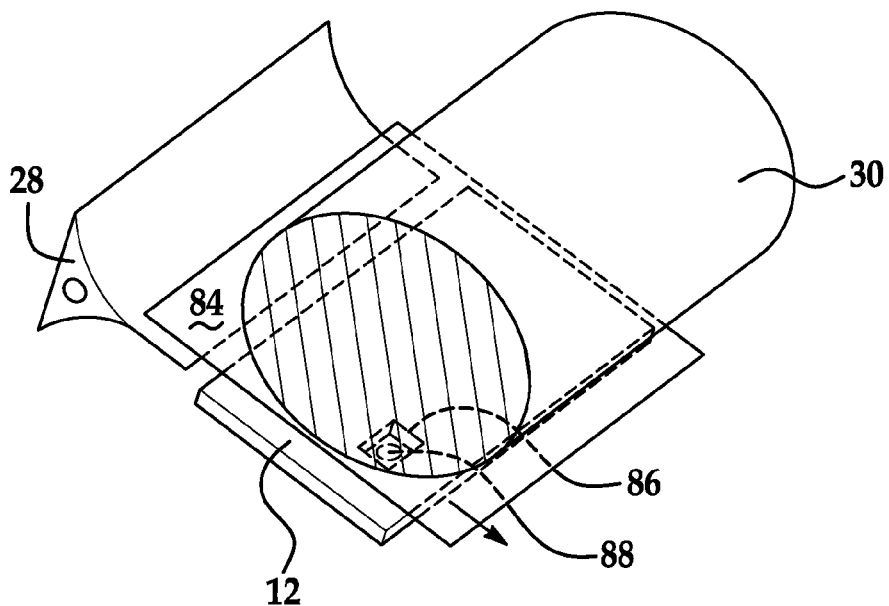
FIG. 2 is a semi-schematic perspective view depicting a portion of the automatic document feeder of the imaging device, in accordance with an embodiment of the disclosure.

FIG. 2 represents a non-limiting example of how an optical sensor may be used to sense the position of a media sheet in the document feeder and whether or not the media sheet is slipping. Viewed from a top perspective view are a media sheet 84 passing between the feed guide 30 on top of the media sheet 84 and the curved guide element 28 and the first document guide 12 on the bottom of the media sheet 84. An opening 86 is defined in the surface of the first document guide 12. A media-positioning sensor 88 may be operatively disposed within the opening 86. The media-positioning sensor 88 is located such that it is able to sense the underside of the media sheet 84, which is resting on top of the first document guide 12. In practice, the media-positioning sensor 88 may be located in any suitable location. In any event, however, it is preferable that the media-positioning sensor 88 does not obstruct the advance of the media sheet 84. The sensor 88 may be an optical sensor, such as a charge-coupled device (CCD) sensor, a complementary metal-oxide semiconductor (CMOS) sensor, or another type of optical sensor.

Figure 3:
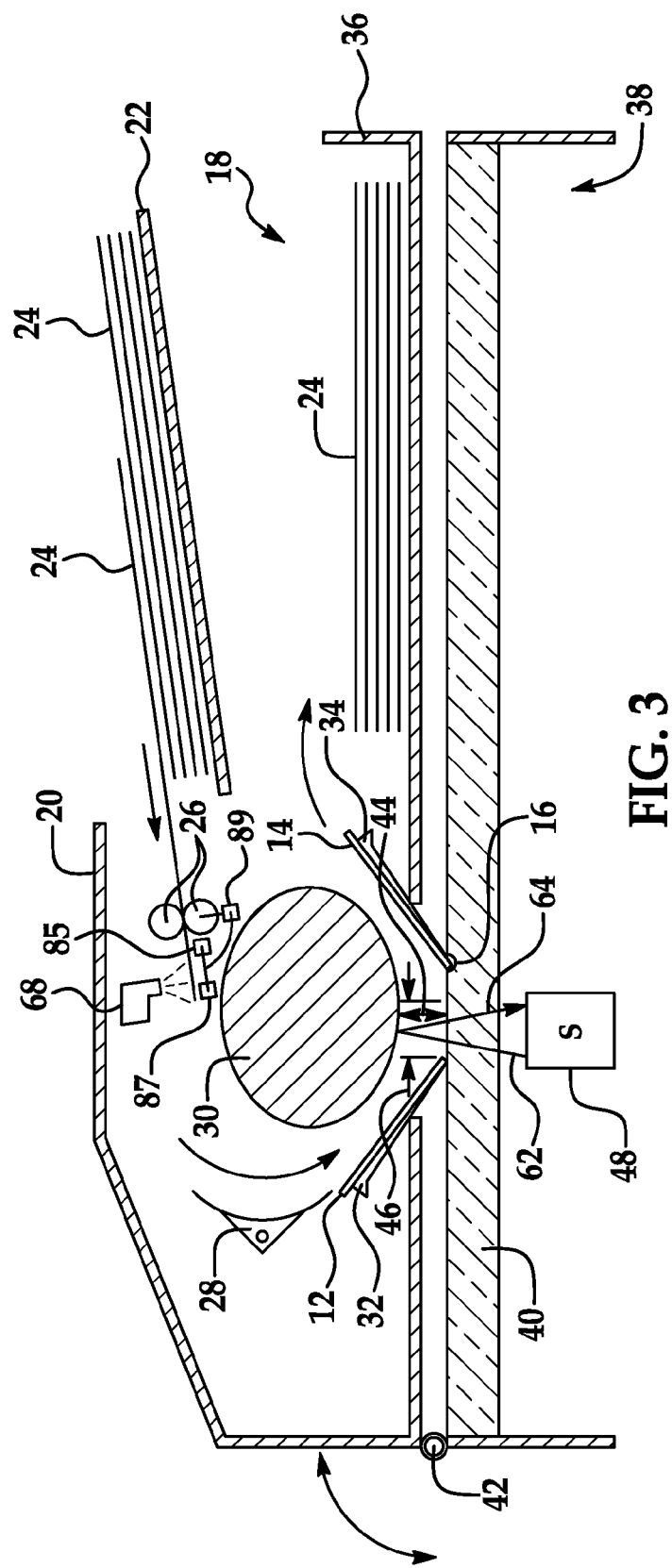
FIG. 3 is a schematic side elevation view including an automatic document feeder, in accordance with another embodiment of the disclosure.

FIG. 3 depicts some details of an ADF 18 that were previously shown in FIG. 1. In addition, FIG. 3 shows a fluid-containing cartridge (with media friction adjusting fluid) 68 positioned between the pinch rollers (pickup and feed) 26 and the feed guide 30. While a media sheet 24 traverses the area of the pinch rollers (pickup and feed) 26, a detecting means, either associated directly with the pinch rollers 26 or existing as another separate mechanical part, can, for example, detect slippage by a media sheet 24. At this stage, the detecting means can send a signal to a fluid-containing cartridge 68, which may be either an inkjet-like cartridge or any other suitable fluid-containing cartridge. The fluid-containing cartridge 68 can, in turn, apply fluid directly to the media sheet 24 for which slippage was detected.

Figure 4:
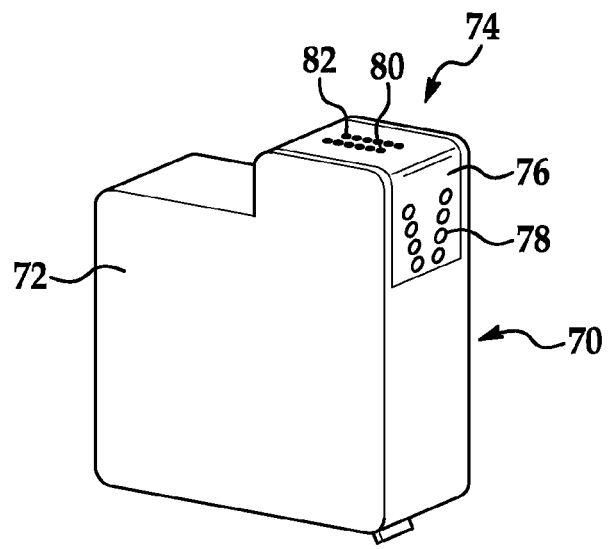
FIG. 4 is a semi-schematic perspective view of a thermal inkjet print cartridge, in accordance with another embodiment of the disclosure.

FIG. 4 is a schematic of a swath-scanning thermal ink-jet print cartridge 70 that can be readily adapted to deliver media friction-adjusting fluid. The body 72 of the cartridge 70 generally contains a chamber that stores and regulates the flow of fluid. A printhead element 74 includes an appropriate electrical connector 76 (such as, in a non-limiting example, a tape automated bonding circuit including a flex tape) used for transmitting signals to and from the printhead via electrical connections 78. Columns of nozzles 82 form an addressable firing array 80. In the context of the present embodiment, the swath-scanning ink-jet print cartridge 70 can be filled with media friction-adjusting fluid, such as, e.g., water. When cartridge 70 receives signals transmitted to it via its electrical connections, it can dispense discretely measured, small amounts of fluid onto the surface of the media page 24 passing by it, responsive to a signal from the detecting means which, substantially instantaneously before, has detected slipping of the media page 24 in the document feeder 18.

Figure 5:
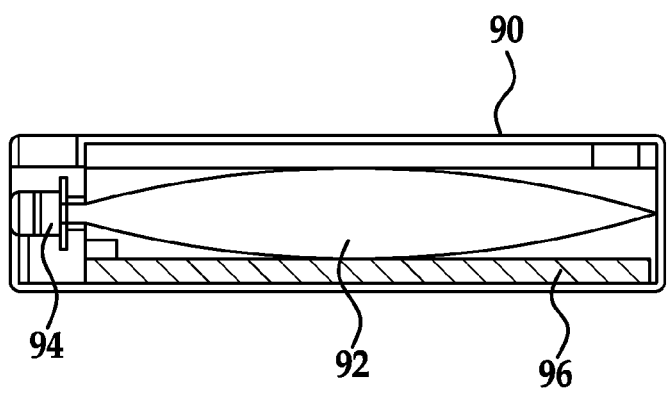
FIG. 5 is a semi-schematic, side cross-sectional view of a piezoelectric inkjet print cartridge, in accordance with another embodiment of the disclosure.

Alternatively, as shown in FIG. 5, a piezoelectric inkjet ink cartridge 90 can also be readily adapted to deliver media friction-adjusting fluid. The cartridge 90 generally contains an ink-storing section (e.g., ink bag) 92 that stores and regulates the flow of fluid. A rubber stopper 94 is operatively disposed at the tip of the ink-storing section 92. A needle (not shown) can be inserted into the rubber stopper 94 to enable fluid from the ink-storing section 92 to be supplied to the printhead. An ink absorber 96 may also be operatively disposed in the cartridge 90 for absorbing waste fluid.

It is to be understood that the terms "connect", "connected" and the like are broadly defined herein to encompass a variety of divergent connection arrangements and assembly techniques. These arrangements and techniques include, but are not limited to (1) the direct connection between one component and another component with no intervening components therebetween; and (2) the connection of one component and another component with one or more components therebetween, provided that the one component being "connected to" the other component is somehow operatively connected to the other component (notwithstanding the presence of one or more additional components therebetween).

While several embodiments have been described in detail, it will be apparent to those skilled in the art that the disclosed embodiments may be modified. Therefore, the foregoing description is to be considered exemplary rather than limiting.

What is claimed is:

1. A method of ascertaining and adjusting friction between a media page and a roller in a document feeder, comprising:
   detecting slipping of the media page when traversing from a stack of media pages to passing through a path defined by the document feeder; and
   sending a signal to a fluid-containing cartridge to spray small drops of fluid other than ink onto the slipping media page to adjust a coefficient of friction between the media and the roller soon after the slipping is detected while the media page passes through the document feeder;
   wherein the fluid-containing cartridge is a thermal or piezoelectric inkjet cartridge, and wherein each small drop of fluid has a volume from about 4 picoliters to about 8 picoliters.

2. The method of claim 1 wherein the media page is selected from the group consisting of plain paper, glossy photo paper, porous paper, and non-porous paper, and wherein the document feeder is operatively connected to a device selected from the group consisting of printers, scanners, photocopiers, digital senders, and fax machines.

3. The method of claim 1 wherein the fluid in the fluid-containing cartridge comprises water.

4. The method of claim 1 wherein the fluid-containing cartridge is positioned in the document feeder between the stack of media pages and an end of the path defined by the document feeder.

5. A method of ascertaining and adjusting friction between a media page and a roller in a document feeder, comprising:
   detecting slipping of the media page when traversing from a stack of media pages to passing through a path defined by the document feeder; and
   sending a signal to a fluid-containing cartridge to spray small drops of fluid other than ink onto the slipping media page to adjust a coefficient of friction between the media and the roller soon after the slipping is detected while the media page passes through the document feeder;
   wherein the fluid in the fluid-containing cartridge is selected from the group consisting of water and an aqueous friction-adjusting fluid, and wherein sending the signal to the fluid-containing cartridge takes place from about 50 milliseconds to about 300 milliseconds after the slipping is detected.

6. A system for ascertaining and adjusting friction between a media page and a roller in a document feeder, comprising:
   a printer including a document feeder;
   a stack of at least two media pages for printing to be taken one-by-one from the stack of media pages and passed through a path defined by the document feeder;
   an optical sensor, operatively disposed in the document feeder, to detect slipping of at least one of the at least two media pages in the document feeder when the media page is traversing from the stack of media pages and being passed through the path defined by the document feeder;
   a mechanism, operatively connected to the optical sensor, to generate a signal to send to a fluid-containing cartridge, the signal responsive to the detection of slipping; and
   a printhead element, operatively connected to the fluid-containing cartridge, to cause, upon receipt of the signal, the fluid-containing cartridge to spray small drops of fluid other than ink onto the slipping media page to adjust a coefficient of friction between the media page and the roller in the document feeder soon after the slipping is detected;

wherein the fluid-containing cartridge is a thermal or piezoelectric inkjet cartridge, and wherein each small drop of fluid has a volume from about 4 picoliters to about 8 picoliters.

7. The system of claim 6 wherein the at least one media page is selected from the group consisting of plain paper, glossy photo paper, porous paper, and non-porous paper, and wherein the document feeder is operatively connected to a device selected from the group consisting of printers, scanners, photocopiers, digital senders, and fax machines.

8. The system of claim 6 wherein the fluid in the fluid-containing cartridge comprises water.

9. The system of claim 6 wherein the fluid-containing cartridge is positioned in the document feeder between the stack of media pages and an end of the path defined by the document feeder.

10. The system of claim 6 wherein the optical sensor is chosen from:
    a media-positioning sensor; or
    at least two spaced apart optical sensors operatively connected to the document feeder path and to a feed roller rotation tracker.

11. A system for ascertaining and adjusting friction between a media page and a roller in a document feeder, comprising:
    a printer including a document feeder;
    a stack of at least two media pages for printing to be taken one-by-one from the stack of media pages and passed through a path defined by the document feeder;
    an optical sensor, operatively disposed in the document feeder, to detect slipping of at least one of the at least two media pages in the document feeder when the media page is traversing from the stack of media pages and being passed through the path defined by the document feeder;
    a mechanism, operatively connected to the optical sensor, to generate a signal to send to a fluid-containing cartridge, the signal responsive to the detection of slipping; and
    a printhead element, operatively connected to the fluid-containing cartridge, to cause, upon receipt of the signal, the fluid-containing cartridge to spray small drops of fluid other than ink onto the slipping media page to adjust a coefficient of friction between the media page and the roller in the document feeder soon after the slipping is detected;
    wherein the fluid in the fluid-containing cartridge is selected from the group consisting of water and an aqueous friction-adjusting fluid, and wherein causing the fluid-containing cartridge to spray takes place from about 50 milliseconds to about 300 milliseconds after the slipping is detected.

12. An apparatus for ascertaining and adjusting friction between a media page and a roller in a document feeder, comprising:
    an optical sensor, operatively disposed in the document feeder, to detect slipping of at least one media page taken from a stack of media pages and passed through a path defined by the document feeder;
    a mechanism, operatively connected to the optical sensor, to generate a signal indicating slipping of the at least one media page; and
    a fluid-containing cartridge operatively connected to the signal generating mechanism, the fluid-containing cartridge: to spray small drops of fluid other than ink onto the at least one media page passing through the path defined by the document feeder upon receipt of the signal; and to stop spraying the fluid upon non-receipt of the signal or upon receipt of a signal from the signal generating mechanism indicating that no slipping is occurring;
    wherein the fluid on the at least one media page adjusts a coefficient of friction between the at least one media page and the roller in the document feeder;
    wherein the fluid-containing cartridge is a thermal or piezoelectric inkjet cartridge, and wherein each small drop of fluid has a volume from about 4 picoliters to about 8 picoliters.

13. The apparatus of claim 12 wherein the at least one media page is selected from the group consisting of plain paper, glossy photo paper, porous paper, and non-porous paper.

14. The apparatus of claim 12 wherein the document feeder is operatively connected to a device selected from the group consisting of printers, scanners, photocopiers, digital senders, and fax machines.

15. The apparatus of claim 12 wherein the fluid in the fluid-containing cartridge comprises water.

16. The apparatus of claim 12 wherein the fluid-containing cartridge is positioned in the document feeder between the stack of media pages and an end of the path defined by the document feeder.

17. The apparatus of claim 12 wherein the optical sensor is chosen from:
    a media-positioning sensor; or
    at least two spaced apart optical sensors operatively connected to the document feeder path and to a feed roller rotation tracker.

18. An apparatus for ascertaining and adjusting friction between a media page and a roller in a document feeder, comprising:
    an optical sensor, operatively disposed in the document feeder, to detect slipping of at least one media page taken from a stack of media pages and passed through a path defined by the document feeder;
    a mechanism, operatively connected to the optical sensor, to generate a signal indicating slipping of the at least one media page; and
    a fluid-containing cartridge operatively connected to the signal generating mechanism, the fluid-containing cartridge: to spray small drops of fluid other than ink onto the at least one media page passing through the path defined by the document feeder upon receipt of the signal; and to stop spraying the fluid upon non-receipt of the signal or upon receipt of a signal from the signal generating mechanism indicating that no slipping is occurring;
    wherein the fluid on the at least one media page adjusts a coefficient of friction between the at least one media page and the roller in the document feeder;
    wherein the fluid in the fluid-containing cartridge is selected from the group consisting of water and an aqueous friction-adjusting fluid, and wherein spraying the fluid takes place from about 50 milliseconds to about 300 milliseconds after the slipping is detected.

* * * * *